Jan. 10, 1967    S. A. LIGUORI    3,296,727
RANDOM ACCESS PROJECTOR
Filed Oct. 9, 1964    3 Sheets-Sheet 1
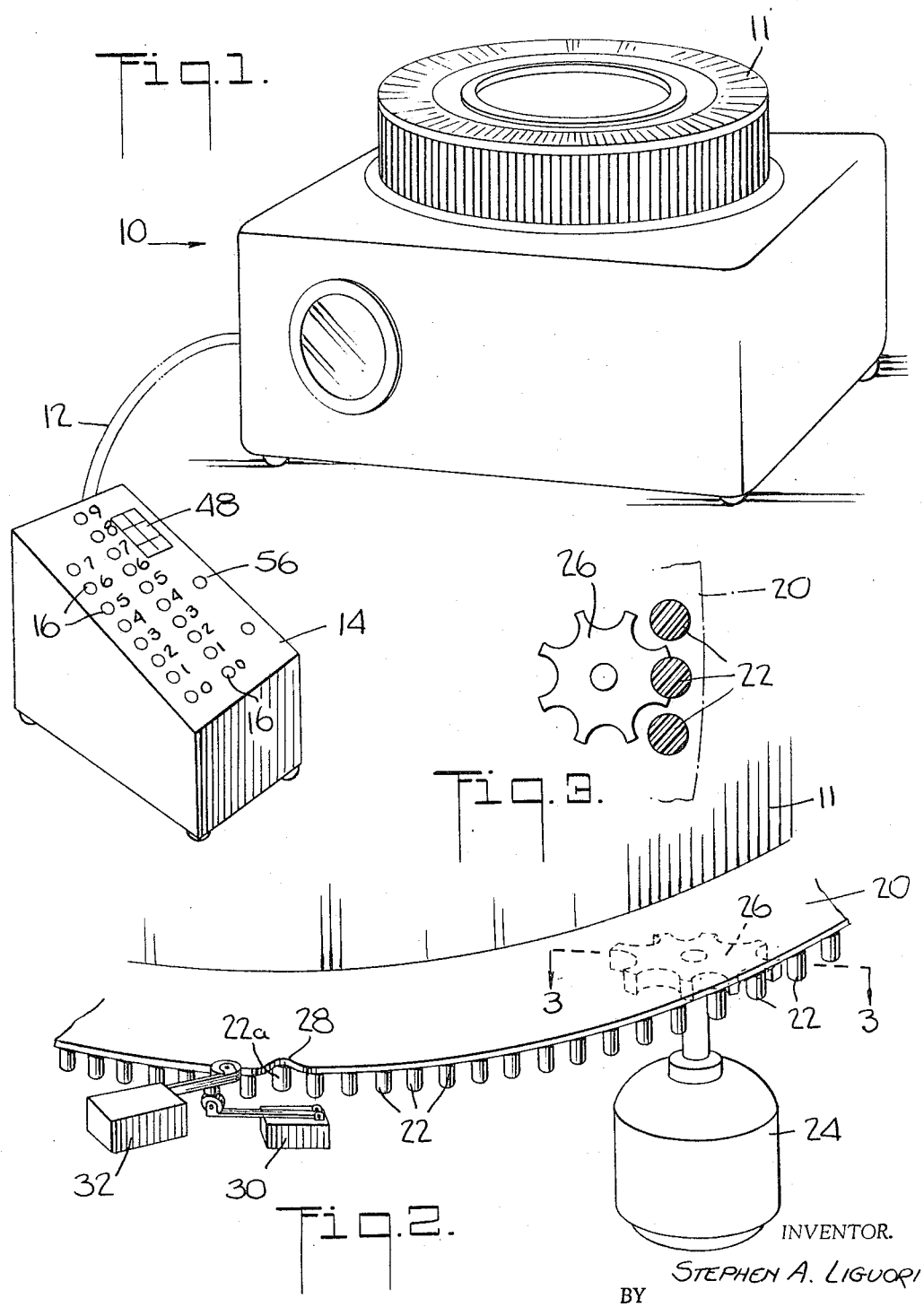
INVENTOR.
STEPHEN A. LIGUORI
BY Kenyon & Kenyon
ATTORNEYS

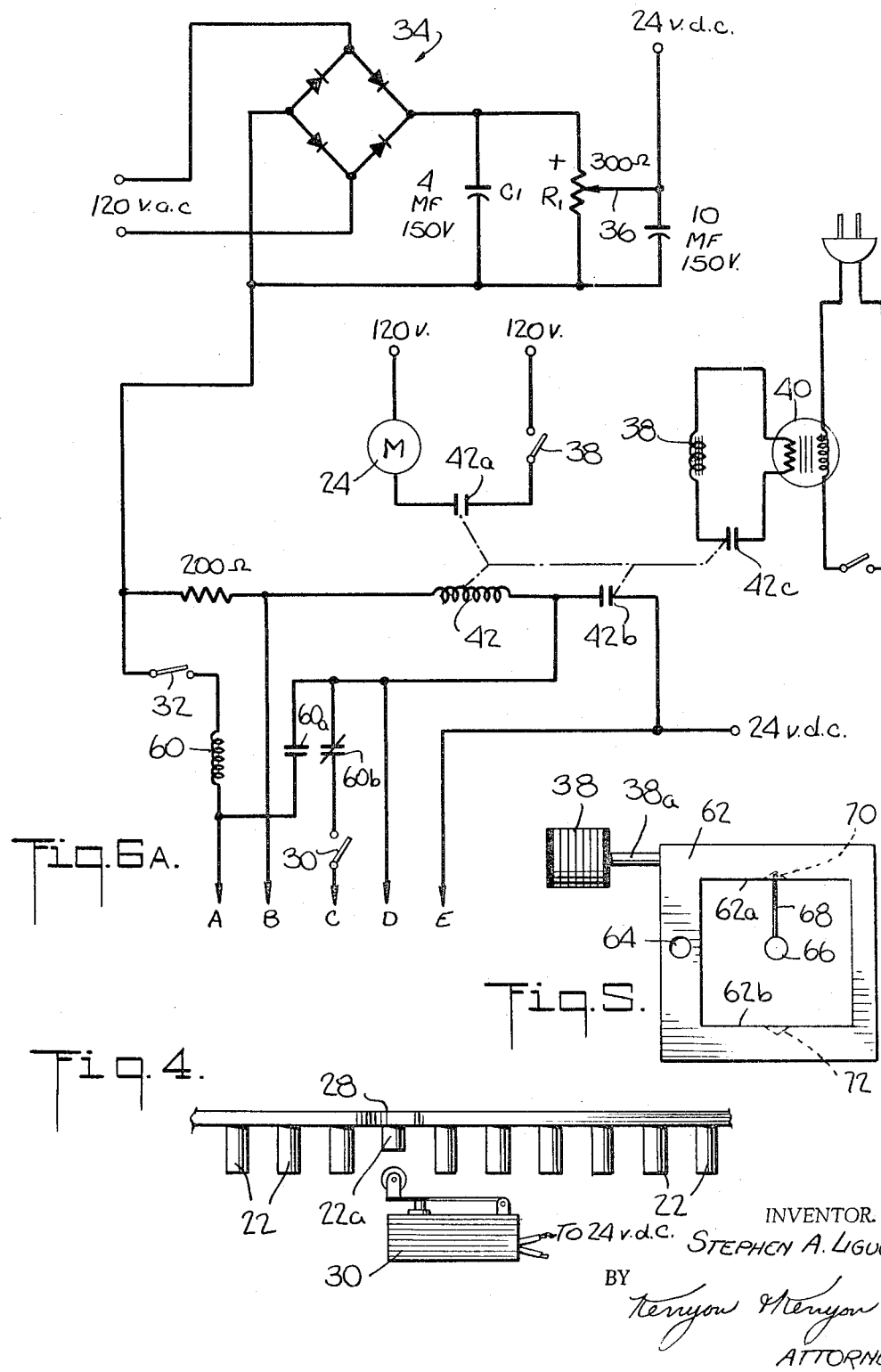

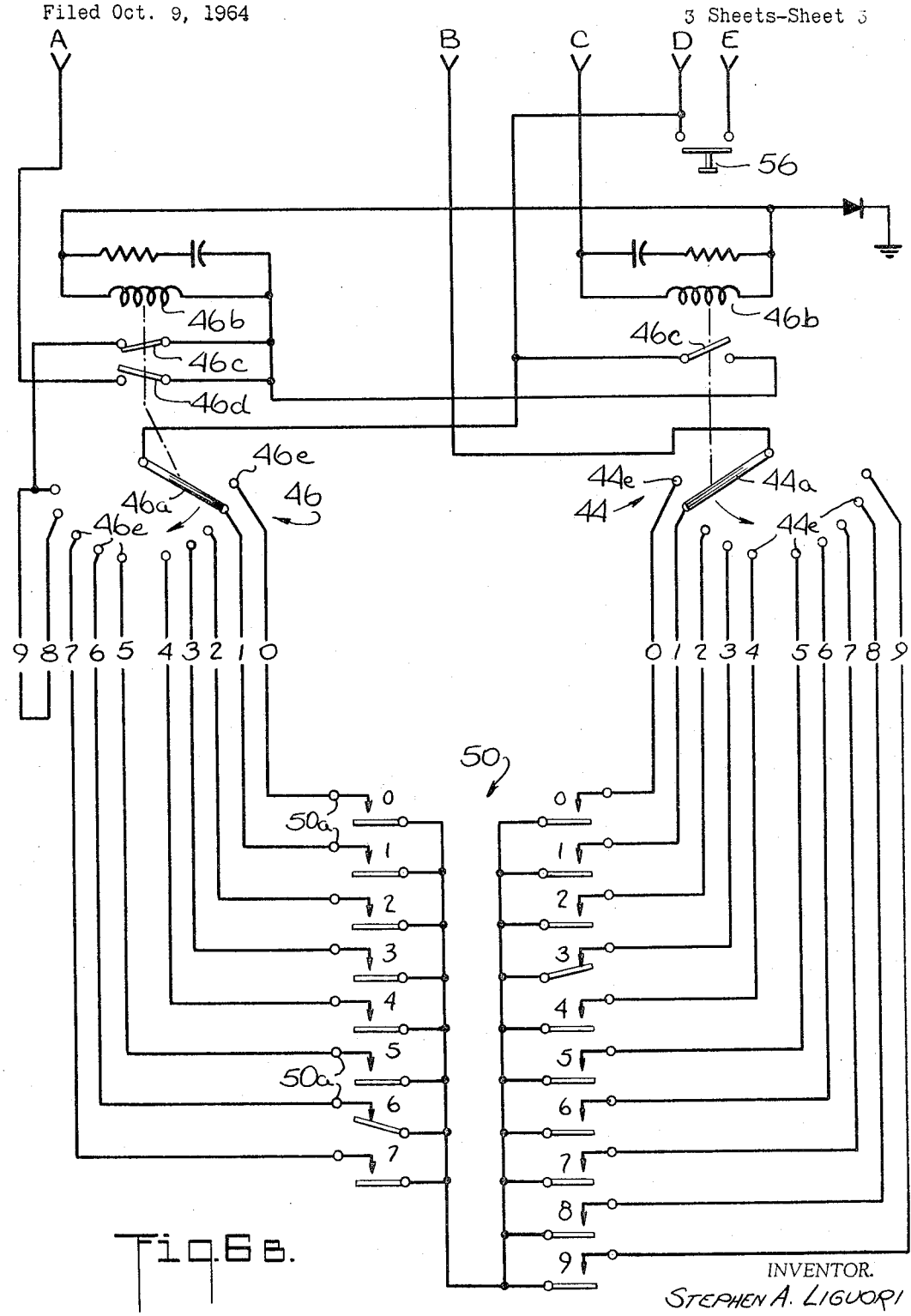

United States Patent Office 3,296,727
Patented Jan. 10, 1967

3,296,727
RANDOM ACCESS PROJECTOR
Stephen A. Liguori, Parkridge, N.J., assignor to Decision Systems Incorporated, Teaneck, N.J., a corporation of Delaware
Filed Oct. 9, 1964, Ser. No. 402,837
7 Claims. (Cl. 40—79)

This invention relates in general to optical slide projectors and more particularly to a means whereby an operator may project stored slides in any order.

Slide projectors are presently known, such as the Sawyer Rotomatic Projector or the Kodak Carousel Projector, which have a rotating slide tray and which function so that slides may be placed in the tray in a pre-determined fashion and projected one at a time in the same sequence as they are placed in the tray. Accordingly, a major limitation on the presently known rotating slide tray projectors is that the slides are available to the projectionist only in the particular order which they are placed in the slide tray. The projectionist is unable to skip around and select slides at random as he wishes.

What is needed is some means whereby the projectionist can, preferably from a remote position, press buttons corresponding to the particular slide desired and thus automatically bring the slide into position for projection.

Accordingly, it is a major purpose of this invention to provide a random access slide projector wherein the operator is enabled to have automatic access at random to any desired slide.

It is a related purpose of this invention to provide a mechanism for obtaining random access to the slides in a projector slide tray that is a simple, inexpensive and reliable apparatus.

It is another purpose of this invention to provide random access with an apparatus that may be incorporated in presently manufactured slide projectors without requiring a complete redesign of the slide projector or extensive modifications to the projector.

It is a further purpose of this invention to provide a remote selector mechanism for allowing an operator removed from the slide projector to select any slide at random for viewing.

In brief, the slide selection mechanism embodiment described herein is adapted to be used with a rotating slide tray, which tray is mounted on the projector. The projector together with a remote selector box constitute the two units of this invention. The projector may be any one of the projectors now produced having a slide tray. A motor is added to the projector to power the tray. The slide tray has a series of small rod-like fingers on it, one finger corresponding to each slot in the tray. A normally open microswitch is mounted in such a position that it is closed each time a finger passes the switch, thereby establishing a pulse of current that is fed by cable to the remote control selector box. The selector box includes two decade stepping switches which respond to the pulses from the microswitch and thereby operate to count the slide slots as the tray rotates by the microswitch. The stepping switches are connected to two decade selector switches, which selector switches are manually controlled by the operator. The stepping switches and selector switches are so interconnected that when the stepping switch steps to a number that is coincident with the number selected by the operator on the selector switch, a circuit is completed that changes the state of a relay in the projector which in turn turns off power to the motor. In this fashion the motor is stepped when the tray has rotated to line up the desired slide in position to be projected.

In addition there is a zero control, certain safety features, a remote starting control and other details which can be comprehended after understanding the detailed description.

Other objects and purposes of this invention will become apparent from consideration of the following detailed description, in which:

FIG. 1 is a perspective view of the assembly in which a remote control selector box is coupled by cable to a standard projector having a slide tray;

FIG. 2 is a perspective view of the few structural modifications required in the standard FIG. 1 projector to accommodate the invention;

FIG. 3 is a partial view along the plane 3—3 of FIG. 2;

FIG. 4 is an elevation view of a portion of the base of the slide tray shown in FIG. 2;

FIG. 5 is a mechanical schematic of the means presently employed to hold all slides in the tray while the tray is being rotated.

FIG. 6A is an electrical schematic of the circuit additions and modifications required within the prior art slide projector; and FIG. 6B is an electrical schematic of the remote control selector box.

As an initial matter, it might be noted that the slide tray is frequently called a slide magazine. The term "tray" tends to be used for a circular slide container which is rotated to achieve access to the desired slide while the term "magazine" tends to be applied more frequently to a rectangular container that is moved back and forth to achieve access to the desired slide. It shall be understood that this invention can be applied to a projector having either type of slide container and the term "tray" shall be used herein to apply to any kind of slide container be it circular or rectangular.

FIG. 1 illustrates the way in which the embodiment of the invention described herein looks when assembled. A standard prior art projector 10 having a tray 11, in which tray the slides are retained, is shown connected by a cable 12 to a selector box 14. Because the tray 11, that comes with the projector 10 that has been adapted to illustrate the invention, happens to have slots for eighty slides, the selector box 14 is arranged with push buttons 16 arranged to permit the operator to select any one of the eighty slides. (The push buttons are labeled in such a fashion that the operator can select any number from "00" to "79," which affords eighty selections.)

The tray 11 itself is a standard item which comes with the projector 10. As may be seen in FIG. 2, the tray 11 has an outwardly extending annular ridge 20 that normally has a series of numerals inscribed on it thereby numbering the associated slots which carry slides. A series of fingers 22 extend down from the under side of the ridge 20. There are a total of eighty-one fingers 22. Each finger 22 corresponds to an increment on the tray 11 which increment equals a slot width. For indexing purposes, there is one such increment that does not contain a slot for a slide. Thus there are eighty-one increments and eighty-one fingers, though eighty slide slots.

As shown in FIGS. 2 and 3, there is added by this invention a motor 24 which drives a gear 26 whose teeth mesh with the fingers 22 so that when the motor 24 is turned on, the gear 26 will rotate the tray 11. FIG. 3 illustrates the engagement between the teeth of the gear 26 and the fingers 22. In the particular embodiment illustrated, the fingers 22 happen to be one-quarter inch long and one-eighth inch in diameter.

A microswitch 30 is positioned, as shown in FIGS. 2 and 4, below the fingers 22 so that the arm of the microswitch 30 rides along the bottom of the fingers 22. When the motor 24 causes the tray 11 to rotate, each finger 22 causes the microswitch 30 to close. As will be explained later, the microswitch 30 is thus employed to provide a series of pulses to a stepping switch in the selector box 14, which stepping switch counts the fingers 22 (and thus the slots associated with the fingers) as the fingers 22 pass the microswitch 30. One of the fingers 22 is an index finger 22a and is shortened (as may best be seen in FIG. 4) so that the microswitch 30 is not actuated when the finger 22a passes by. In this fashion no count is made for the position on the slide tray 11 where no slide is available.

There is one indent 28 in the edge of the ridge 20 to establish a point from which the slots are numbered and from which a count of the slots may be obtained. A microswitch 32 is held closed by having its arm ride along the edge of the ridge 20. Once during each revolution of the tray 11, the arm of the microswitch 32 rides into the indent 28 thereby opening the mircoswitch. As will be described later, the opening of the microswitch 32 operates in conjunction with a contact in the selector box 14 to stop the counting of the slots in the rotating tray 11 if and when the counter in the selector box 14 does not count "00" while the arm of the microswitch 32 rides into the indent 28. This serves to correct any error between the counting microswitch 30 count and the position of the slide tray 11.

In the presently available projector, normal operation involves the operator pushing an "Advance" button which energizes the solenoid 38 thereby releasing a known latching mechanism. The release of the latch releases the shaft to which the various operative cams and the motor 40 are connected so that the projector goes through a full cycle. This full cycle includes removing the slide from the projection frame thereby placing it in the slide tray, advancing the slide tray one position and dropping the next succeeding slide into the projection frame. Because the operator releases the advance button prior to the completion of this full cycle, the solenoid becomes de-energized thereby placing the latch mechanism in a position that holds the cam shaft.

In addition, there is a "Manual Selector" button which the operator can press in lieu of the advance button. Pressing the Manual Selector button mechanically releases the latching mechanism so that the cam shaft is free to turn as during normal "Advance" button operation. However, the Manual Selector button places the latching mechanism in position to intercept the cam shaft half way through the cycle. This second latch position is obtained only when the Manual Selector button is pressed. The second latch position holds the cam shaft at the point where the cams have pushed the slide back into the tray and where the tray locking mechanism has been retracted. Thus the operator, by holding one finger on the Manual Selector button, can manually turn the tray 11 to whatever slot position he desires. If he has turned the tray to the desired slot position he then lifts his hand off the Manual Selector button thereby releasing the latch and the rest of the cam cycle will be completed.

In order to obtain proper remote control operation in the invention, the latch mechanism must be slightly modified so that the tray 11 is free to rotate when the change button 56 is pushed.

FIG. 5 illustrates the latching mechanism which is employed in the embodiment of the invention described herein. The FIG. 5 latch is a slight modification on the latch used in presently available projectors. The solenoid 38 is shown in the unenergized state with its armature 38a extended. The armature 38a is permanently connected to a rectangular latching frame 62. The rectangular latching frame 62 is mounted to pivot on a shaft 64 located at one of its sides. The frame 62 is positioned so that it surrounds the cam shaft 66. A wire 68 is mounted in the shaft 66 and extends radially outward toward the inside surface of the rectangular latch frame 62. A V-shaped fork 70 is stamped into the inside downwardly facing surface 62a of the frame 62. When the solenoid 38 is unenergized the wire 68 will catch in the fork 70 and thus prevent the cam shaft 66 from rotating. A second V-shaped fork 72 is located on the surface 62b. However, the shaft 66 is so positioned within the frame that the shaft 66 is farther from the surface 66b than from the surface 66a. Thus when the latch frame 62 is in the position shown the wire brake 68 will catch in the fork 70 and not in the fork 72.

When the solenoid 38 is energized, the solenoid armature 38a retracts (moves to the left as seen in FIG. 5) thereby causing the latch frame 62 to rotate counter-clockwise on its shaft 64. This moves the fork 70 up and to the left releasing the wire brake 68 and permitting the shaft 66 to rotate clockwise. The rotation of the frame 62 also causes the fork 72 to move up and to the right bringing it closer to the shaft 66. Thus, the fork 72 catches the wire brake 68 after the cam shaft 66 has rotated approximately 180°. It is while the fork 72 holds the shaft 66 that the tray 11 is free to rotate and does rotate, being driven by the drive motor 24. As is explained herein, when the drive motor 24 has brought the desired slide into position adjacent to the projection frame, the solenoid 38 is de-energized thereby pushing the frame 62 back to the position shown in FIG. 5 and disengaging the wire brake 68 from the fork 72. This allows the cam shaft 66 to rotate another 180° (to the position shown in FIG. 5) at which position, the cams have placed the desired slide in the projection frame for viewing.

FIGS. 2, 3, 4 and 5 illustrate the few mechanical modifications that must be made in the available projector 10 to accommodate this invention. In brief, the only strictly mechanical modifications required are: (a) the addition of a gear 26 to mesh with the already existing fingers 22, (b) the foreshortening of the finger 22a, which finger 22a is not necessarily foreshortened in applications not involving this invention, and (c) the modified latch frame 62. All other additions and modifications are essentially electrical in nature, such as the addition of the drive motor 24 and of the microswitches 30 and 32.

FIGS. 6A and 6B illustrate all of the electrical additions and modifications required for this invention. FIG. 6A is an electrical schematic of the relevant portions of the projector 10 itself. FIG. 6B is an electrical schematic of the selector box 14. The lines A, B, C, D and E are contained in the cable 12 to serve to make the necessary electrical connections between the FIG. 6A circuitry and the FIG. 6B circuitry. In practice, there may be other lines in the cable 12 to serve purposes other than those of concern to this invention.

There is normally available 120 volts A.C. power in the projector 10. Since 24 volt D.C. is desired in this invention to step the stepping switch, a bridge rectifier 34 is employed together with a capacitor C1 and resistor R1 to provide a source of direct current. A tap 36 on the resistor R1 permits obtaining the desired 24 volt level for the D.C.

The projector unit 10 contains a solenoid 38 and motor 40 (illustrated in FIG. 6A) which do not have to be added by this invention, to run the various cams required to perform such functions as opening and closing the shutter at the appropriate time, putting the slide into the projection frame, holding the slide tight in the frame, and locking the slot into position above the projection frame. The motor 40 also runs the cooling fan. The exact means by which the various cams move the slide into the projection frame and back into the tray are known in this art and need not be described here. The solenoid 38 controls the latching mechanism 62 (described in FIG. 5) which controls the position of the various cams driven by the motor 40. Thus the solenoid 38 controls the cycle of projector operation once the tray 11 is in the desired position. The design, which is a known design, is such that when the solenoid 38 is de-energized, the latching mechanism and cams it controls are in a position so that the slide (in the slot adjacent the projection frame) is dropped into the projection frame. When the solenoid 38 is energized, the latching mechanism and cams it controls is moved to a position which pushes the slide back into the tray 11 so that the tray 11 is free to move to a new position. By means of this invention, the energization of the solenoid 38 is controlled by a relay 42 contact 42c. The operation of the relay 42 is in turn controlled by the circuit in the selector box 14. Thus the rest of FIG. 6A can best be understood after an examination of FIG. 6B.

Two similar decade stepping switches 44 and 46 are shown, the switch 44 being the "units" switch and the switch 46 being the "tens" switch. Because the particular tray 11 which this selector mechanism is to control has eighty slots for slides, the "9" terminal on the tens switch 46 is tied to the "8" terminal. In this fashion a standard decade switch 46 may be employed without requiring a specially made and thus more expensive switch. The position of the arms 44a and 46a on the stepping switches 44 and 46 is determined by the position of the slide tray. The arms 44a and 46a are stepped by pulses to the coils 44b and 46b respectively. The required pulses are generated as the slide tray 11 rotates and the counting switch 30 opens and closes through contact with the fingers 22.

The pulses from the counting switch 30 are applied through terminal C of the cable 12 to the stepping coil 44b of the units decade switch 44. Each pulse serves to pulse the arm 44a of the units stepping switch 44 one unit. When ten units have been stepped, the arm 44a (at the "0" contact) mechanically closes to switch 44c thereby imposing 24 volt D.C. from terminal D on the stepping coil 46b associated with the tens stepping switch 46. This causes the arm 46a to step one terminal. The next pulse through the units coil 44b moves the arm 44a off of the "0" terminal and thus opens the switch 44c to remove voltage from the coil 46b and thus complete the pulse through coil 46b. This sequence is repeated once every ten pulses until the arm 46a is stepped to terminal "8" on the tens switch 46.

When the arm 46a is stepped to contact "8" a circuit is established through the arm 46a and switch 46c, connecting the stepping coil 46b to a source of voltage from terminal D. This immediately causes the arm 46a to be stepped to terminal "9." The arm 46a as it leaves terminal "8" breaks the path from terminal D to the coil 46b thereby completing the required stepping pulse. But as the arm 46a contacts terminal "9," the voltage is reestablished at the stepping coil 46b thereby immediately causing the arm 46a to step to the next terminal, which is the "0" terminal. It might be noted that the terminals in each of the switches 44 and 46 are actually laid out equally spaced along the circumference of a circle so that the "0" terminal is equally spaced between the "1" terminal and the "9" terminal. For ease of illustration, the stepping switch 44 and 46 terminals are shown in FIG. 6B along the arc of a circle instead of the complete circle in which they are actually deployed. When the arm 46a is stepped to the "0" terminal, it mechanically opens the contact 46c and mechanically closes the contact 46d. Thus the counting switches 44 and 46 are interconnected so that the arms 44a, 46a are stepped immediately from a "79" reading to a "00" reading on the incidence of a single pulse from the counting switch 30.

The above description of the stepping switches 44, 46 shows how the position of the arms 44a and 46a is controlled by the rotation of the tray 11. As long as the tray 11 is in phase with the arms 44a, 46a, then the reading on the stepping switches 44, 46 will correspond to the designating numeral on the slide slot adjacent the projection frame. Once the tray 11 has been properly positioned, the positive engagement between the gear 26 and fingers 22 should assure no discrepency. However, a "00" check circuit is included to automatically bring about coincidence between stepping switch 44, 46 reading and tray 11 position. The voltage established at terminal A, by the closing of switches 46d and 44c when the arms 44a, 44b are in the "00" position, is used to make this "00" check as will be described in greater detail further on.

A separate circular numeral display wheel is mechanically coupled to each of the arms 44a, 46a, so that the operator can read the stepping switch numeral through a window 48 in the selector box 14.

The terminals 44e, 46e on the stepping switches 44, 46 are individually connected to separate terminals 50a of a selector switch 50. The operator by pressing the buttons 16 (shown in FIG. 1) associated with the appropriate terminals 50a can select a number corresponding to the number of the slot on the rotating tray that contains the next slide he desires to project. When the operator depresses the buttons 16 corresponding to the slide he wishes to project, the corresponding terminals 50a will be electrically connected through the common electrical terminal 54. For example, FIG. 6B illustrates the connections established when the number "63" is selected. When the stepping switch arms 46a and 44a are stepped to terminals 44c, 46c which correspond to the selected number "63" on the terminals 50a, a voltage will be passed which results in de-energizing relay 42, thereby opening contact 42a and removing voltage from the drive motor 24. More particularly, coincidence between the stepping switch 44, 46 and the selector switch 50 results in 24 volts D.C. being passed from terminal D, through arm 46a, the associated terminal 46e, a first terminal 50a, the common terminal 54, a second terminal 50a, a terminal 44e, the arm 44a to cable 12 terminal B.

The operation of the slide projector may be understood as follows. The operator first selects the slide which he desires to project by pushing the appropriate buttons 16 to the selector switch 50. This two digit number corresponds to the number of the slot on the tray in which the desired slide is located. The operator then pushes the change button 56 (see FIG. 6B) thereby connecting terminals D and E so that the 24 volt D.C. current can flow through the main control relay 42 (see FIG. 6A). The energization of relay 42 closes normally open contact 42b which then operates as a holding contact for the relay 42 and thus when the operator lets go of the change button 56, the relay 42 will remain energized. Relay contact 42c is simultaneously closed which serves to energize the cycle solenoid 38. The cycle solenoid 38 when thus energized causes whatever slide may be in position for projection to be pushed back into the tray 11. When the arm that brings the slide into the tray 11 is in its completely extended position, it contacts and closes the microswitch 58. Since the normally open contact 42a has also been closed by the energization of relay 42, the closing of microswitch 58 results in the 120 volt line being connected to the drive motor 24. With the drive motor 24 energized, the tray 11 spins around.

As long as the relay 42 is energized, voltage is supplied through the relay holding contact 42b to one terminal of the counting microswitch 30. As the microswitch 30 closes and opens in response to contact with fingers 22, pulses are transmitted through cable 12 terminal C to the stepping switch coil 44b. When the switches 44, 46 have stepped to the selected number, the 24 volts D.C. on terminal D is connected through the switches 44, 46, 50 to terminal B. The relay coil 42 is connected at one end to terminal B and the other end to the 24 volt D.C. so that the appearance of 24 volt D.C. at terminal B de-energizes relay 42. Accordingly, contact 42a opens and the drive motor 24 stops so that the desired slide is in position to be placed in the projection frame. At the same time, contact 42c opens to de-energize the solenoid 38 and thus drop the slide into the projection frame. Contact 42b also opens so that circuit is placed in condition for the operator to pre-select the next slide and, when he wishes to project that pre-selected slide, to push the change button 56 and start the cycle again.

Because this invention involves a counting technique to determine and designate the particular slot in the tray 11 which is adjacent the viewing position, there must be some technique for establishing start of the count. The rotating tray 11 has a unique position on it (the indent 28) which the counting circuit will recognize as the "00" position and from which the count will proceed. This unique position is also important to enable the circuit to check itself for error in case the position of the tray 11 becomes at variance with the position of the arms 44a and 46a of the stepping switches 44 and 46.

To establish the "00" check, there is included a relay 60 having a normally open contact 60a and a normally closed contact 60b. The coil of relay 60 is connected to the 24 volt D.C. supply through the microswitch 32 and, by means of cable 12 terminal A, through the stepping switch contacts 46d and 44c. The microswitch 32 rides along the edge of the tray rim 20 and is thus held closed except once during each rotation of the tray when it rides into the indent 28 (see FIG. 2). As discussed above, the contacts 46d and 44c are mechanically closed by their respective arms 46a and 44a when these arms are at the "0" terminal of the respective stepping switches. Thus contacts 44c and 46d are both closed simultaneously only at the "00" position of the stepping switches 44, 46. However, since it is at that position that the microswitch 32 is open, the relay 60 normally remains unenergized.

But, if the tray 11 and stepping switches 44, 46 are not in phase, then when the stepping switch reads "00," the switch 32 will be closed and the relay 60 energized. As a consequence, contact 60b will open removing voltage from the counting switch 30. Contact 60a closes to act as a holding circuit for the coil of relay 60. The tray 11 will continue to turn but the stepping switches will remain at the "00" position. When the tray 11 turns to the point where the microswitch 32 rides into the indent 28, the relay 60 will be de-energized and contact 60b will close again. At this point the tray 11 is in phase with the stepping switches and the count through the microswitch 30 proceeds as it should.

For stability reasons, it is desirable for the span of time during which the switch 32 is opened be slightly greater than the period of time during which the arms 44a and 46a rest on the terminal 44e and 46e. This is to assure that switch 32 opens before both arms 44a and 46a arrive at their respective "0" terminals and that the switch 32 remains open until the arms 44a and 46a leave their respective "0" terminals. This relationship is readily achieved by designing the indent 28 to have a span somewhat greater than the diameter of a finger 22.

The above design achieves the purposes of this invention in a simple, inexpensive and reliable fashion. The pulse counting technique is crucial to the achievement of these purposes of the invention. It might be possible to employ a synchro motor as the drive motor 24, which synchro motor would have its position determined by the magnitude of an input voltage. The magnitude of the input voltage could then be determined by the number selected at the selector box so that the magnitude of the voltage would be an analog of the slide number desired. However, such a design is not only more complex and less reliable but it is also more expensive.

This invention is described in connection with an embodiment that is particularly adapted to be employed with existing projectors such as the Kodak Carousel slide projector. Thus it is shown that this invention fulfills the purpose of providing random access at a remote operator location without requiring extensive redesign of the slide projector. Indeed, the invention makes it possible for those who presently own slide projectors to incorporate the invention on the slide projectors with a minimum of reworking of the slide projector. It should be understood, however, that the invention can conveniently be incorporated in any original design of a slide projector to achieve the same results, specifically to achieve the result of permitting the operator to have a push button remote control over the slide that is next to be projected and thereby provide random access to the slides in the tray to a projector without requiring him to manually manipulate the slide tray.

For the above reasons, this invention was described in connection with a particular known slide projector. It would be obvious to one skilled in this art that the invention could be adapted to any slide projector having a slide tray or magazine. Furthermore, it would be obvious to those in this art that various modifications could be made in the particular embodiment disclosed without departing from the inventive concept.

For example, simplicity of reference, various switches are referred to herein as microswitches. The particular structure of the switch may be of the simple leaf-spring type of switch and such has been found satisfactory. Indeed, the counting switch 30 is preferably a leaf-spring type of switch in order to minimize the "breaking" time. In many applications it is desired to have the tray 11 rotate as fast as possible. Obviously, the reduction speed is limited by the stepping switch 44, 46 stepping time. If the switch 30 has an "opening" or "breaking" time, that time would be added to the stepping time and further limit the maximum tray 11 speed available. The use of a leaf-spring switch as the switch 30 minimizes the "breaking" time.

It is desirable, and may even be necessary, to equip the motor 24 with some braking mechanism so that when the contact 42a opens, the motor 24 will come to an immediate stop and not run the slide tray past the desired slide position. In one embodiment, this was achieved by means of a permanent magnet brake within the drive motor. However, any one of a number of braking techniques could be employed including the use of reverse pulse or the use of a solenoid brake.

In addition, it would be possible to add a relay so that the motor could be run either clockwise or counter-clockwise and the tray thus run in either direction. This reversal relay could be controlled by a button on the selector box 14. Incorporation of a reversal technique would cut down on the average access time if a circular slide tray was employed. When the invention is adapted to a projector having a rectangular slide tray (magazine), such a reversal relay would be necessary.

It is to be understood that the following claims cover these and other variations in the invention or would be obvious to one skilled in this art.

What is claimed is:

1. In a slide projector having a movable slide tray with slots for slides and an automatic slide changing mechanism, the improvement comprising:
    means to move said tray,
    pulse means to generate a pulse signal each time one of said slots moves past a predetermined position,
    counting means responsive to said pulse signal to provide an indication of the position of said tray,
    manually operable selection means to provide the designation of a desired position of said tray,
    control means responsive to said indication of said counting means and responsive to said designation of said selection means to brake said tray and actuate said automatic slide changing mechanism when said indication of said counting means coincides with said designation of said selection means.

2. In a slide projector having a rotatable slide tray with slots for slides and an automatic slide changing mechanism, the improvement comprising:
    a motor connected to rotate said tray,
    pulse means to generate a pulse signal each time one of said slots moves past a predetermined position,
    counting means responsive to said pulse signal to provide an indication of the position of said tray,
    manually operable selection means to provide the designation of a desired position of said tray, control means responsive to said indication of said counting means and responsive to said designation of said selection means to brake said motor and actuate said automatic slide changing mechanism when said indication of said counting means coincides with said designation of said selection means.

3. The slide projector improvement of claim 2 further characterized by:
indexing means to provide an error signal if said counting means indicates "zero" when said tray is at other than its "zero" position, and
means responsive to said error signal to disenable said counting means until said tray rotates to its "zero" position.

4. In a slide projector having a rotatable slide tray with slots for slides and an automatic slide changing mechanism, said mechanism including a solenoid having a first state and a second state, said solenoid when in said first state causing said mechanism to place whatever slide is in the slot adjacent to the projection frame into the projection frame, the improvement comprising:
a motor connected to rotate said tray,
pulse means to generate a pulse signal each time one of said slots rotates past a predetermined position,
counting means responsive to said pulse signal to provide an indication of the position of said tray,
manually operable selection means to provide the designation of a desired position of said tray,
coincidence means responsive to the indication of said counting means and to the designation of said selection means to provide a control signal when said indication corresponds with said selection, and
control means responsive to said control signal to stop said motor from rotating said tray and to force said solenoid into said first state on receipt of said control signal,
whereby the movement of said tray to a position corresponding to that designated by said selection means results in stopping the rotation of said tray and the placing of the desired slide in position for projection.

5. The slide projector improvement of claim 4 further characterized by:
indexing means to provide an error signal if said counting means indicates "zero" when said tray is at other than its "zero" position, and
means responsive to said error signal to disenable said counting means until said tray rotates to its "zero" position.

6. In a slide projector having a movable slide tray with slots for slides and an automatic slide changing mechanism, said mechanism having a position whereby it is effective to place a slide from a slot adjacent the projection frame into the projection frame, the improvement comprising:
a motor connected to said tray to move said tray,
pulse means to generate a pulse signal each time one of said slots moves past a predetermined position,
counting means responsive to said pulse signal to indicate the position of said tray, said counting means including a stepping switch coupled to said pulse signal, each pulse of said signal serving to step said stepping switch one count,
a manually operable selector switch adapted to permit an operator to designate the desired position of said tray, the terminals of said selector switch being individually connected to corresponding terminals of said stepping switch so that a complete circuit through said switches is effected when the stepping switch is stepped to a position corresponding to the position designated on said selector switch, a control relay having its coil connected to the stepping arm of said stepping switch to change in state in response to the completion of said complete circuit through said switches,
a first set of contacts of said relay in the power line of said motor to cut off power to said motor when said relay changes state in response to the completion of said circuit through said switches, and
a second set of contacts of said relay in a power line to said automatic slide changing mechanism to switch said mechanism into said position whereby it is effective to place a slide from the one of said slots that is adjacent to the projection frame into said projection frame when said relay changes state in response to the completion of said circuit through said switches,
whereby coincidence between said stepping switch and said selector switch changes the state of said relay to stop said tray at the coincidence position and to actuate the projection mechanism.

7. In a slide projector having a rotatable slide tray with slots for slides and an automatic slide changing mechanism, said mechanism including a solenoid having a first state and a second state, said solenoid when in said first state causing said mechanism to place whatever slide is in the slot adjacent to the projection frame into the projection frame, the improvement comprising:
a motor connected to rotate said tray,
pulse means to generate a pulse signal each time one of the said slots rotates past a predetermined position,
counting means responsive to said pulse signal to indicate the position of said tray, said counting means including a stepping switch coupled to said pulse signal, said stepping switch having an arm and a plurality of terminals, each pulse of said pulse signal serving to step said arm one terminal and thus one count,
a manually operable selector switch adapted to permit an operator to designate the desired position of said tray, said selector switch having a plurality of terminals, the terminals of said selector switch being individually connected to corresponding terminals of said stepping switch so that a complete circuit through said switches is effected when said arm of said stepping switch is stepped to a position corresponding to the position designated on said selector switch,
a control relay having its coil connected to the stepping arm of said stepping switch to change in state in response to the completion of said complete circuit through said switches,
a first set of contacts on said relay and in the power line of said motor whereby said change of state of said relay will cut off power to said motor, and
a second set of contacts on said relay and in the power line to said solenoid whereby said change of state of said relay will force said solenoid into said first state,
whereby coincidence between said stepping switch and said selector switch changes the state of said relay to stop said tray at the coincidence position and to actuate the projection mechanism.

References Cited by the Examiner
UNITED STATES PATENTS
3,225,652  12/1965  Sauppe _____ 40—33 X EUGENE R. CAPOZIO, *Primary Examiner.*

W. GRIEB, *Assistant Examiner.*